April 2, 1929.  G. A. SHAFFER ET AL  1,707,580

MACHINE FOR INTERFOLDING SHEETS

Filed Nov. 7, 1927   11 Sheets-Sheet 1

Inventors
Glenn A. Shaffer
and Franklin H. Wirtz

By Brown & Phelps
Attorneys

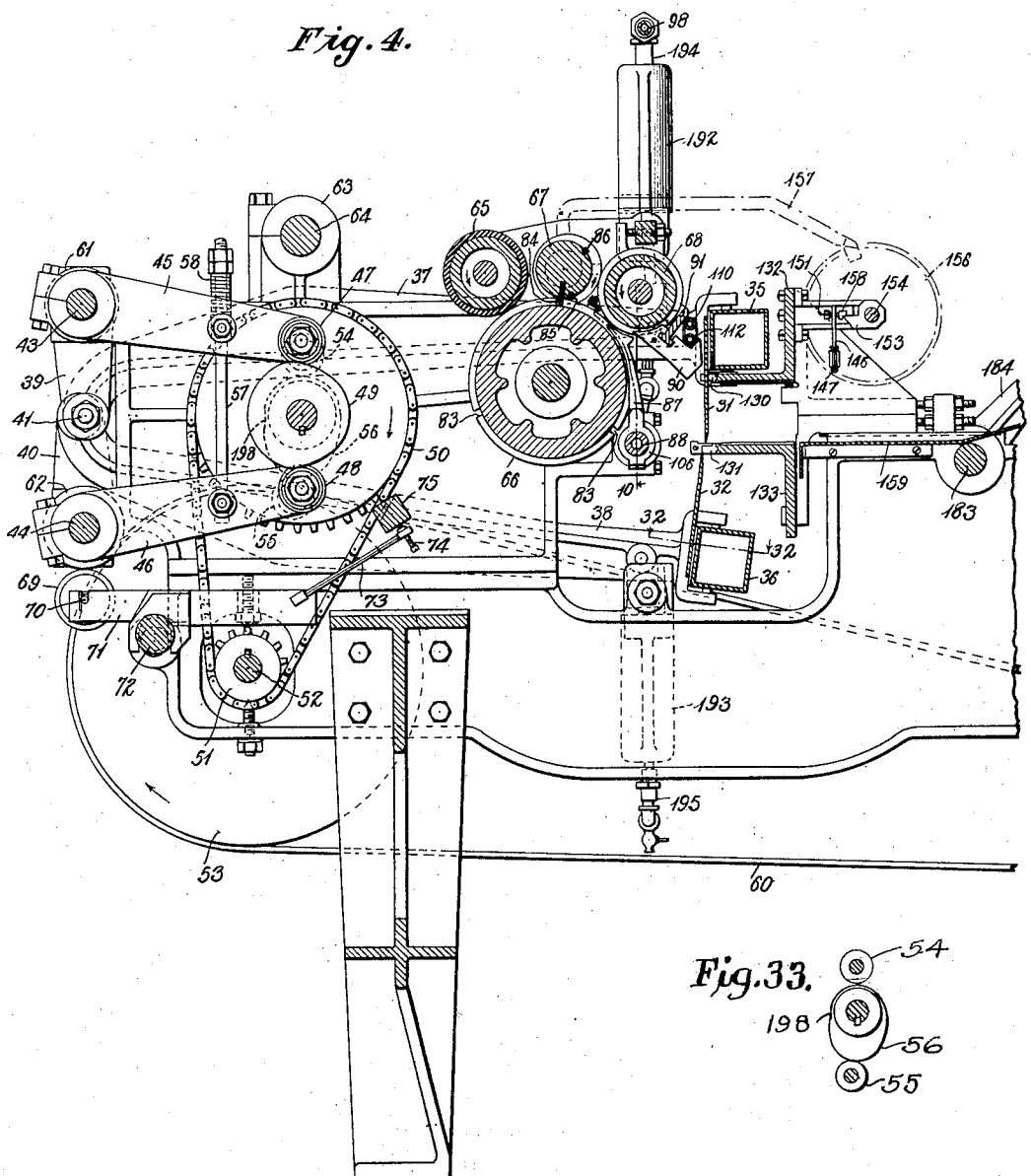

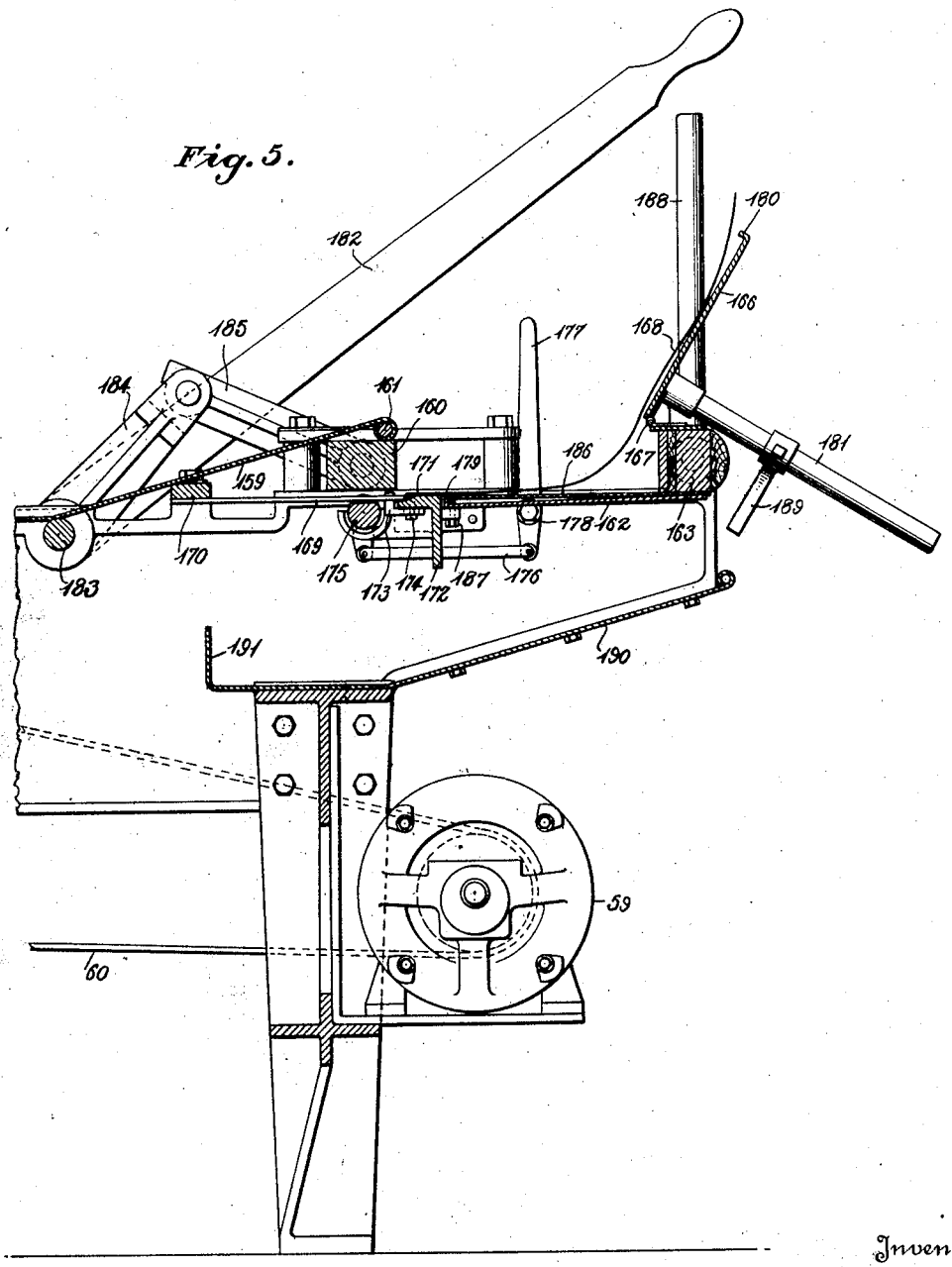

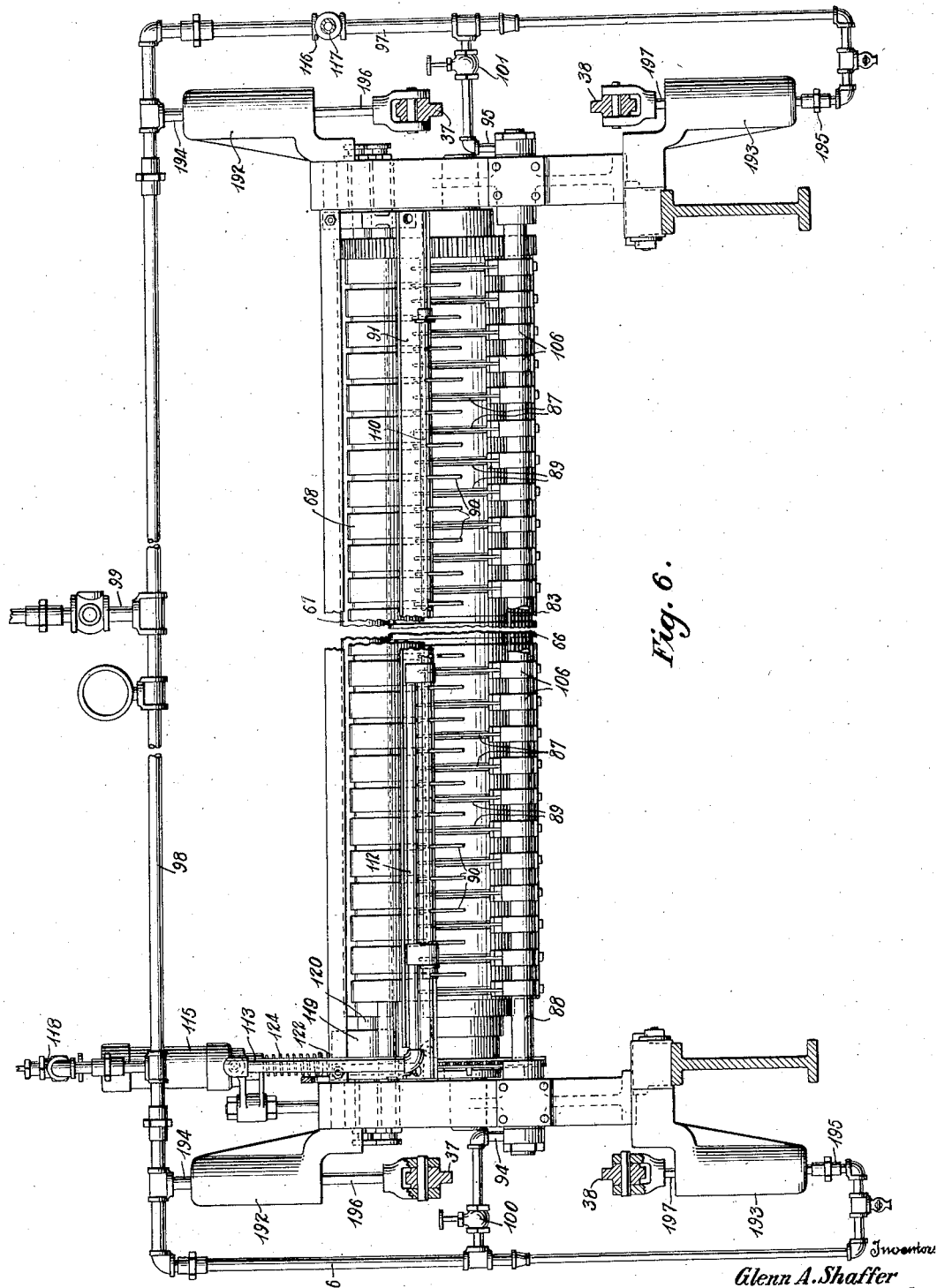

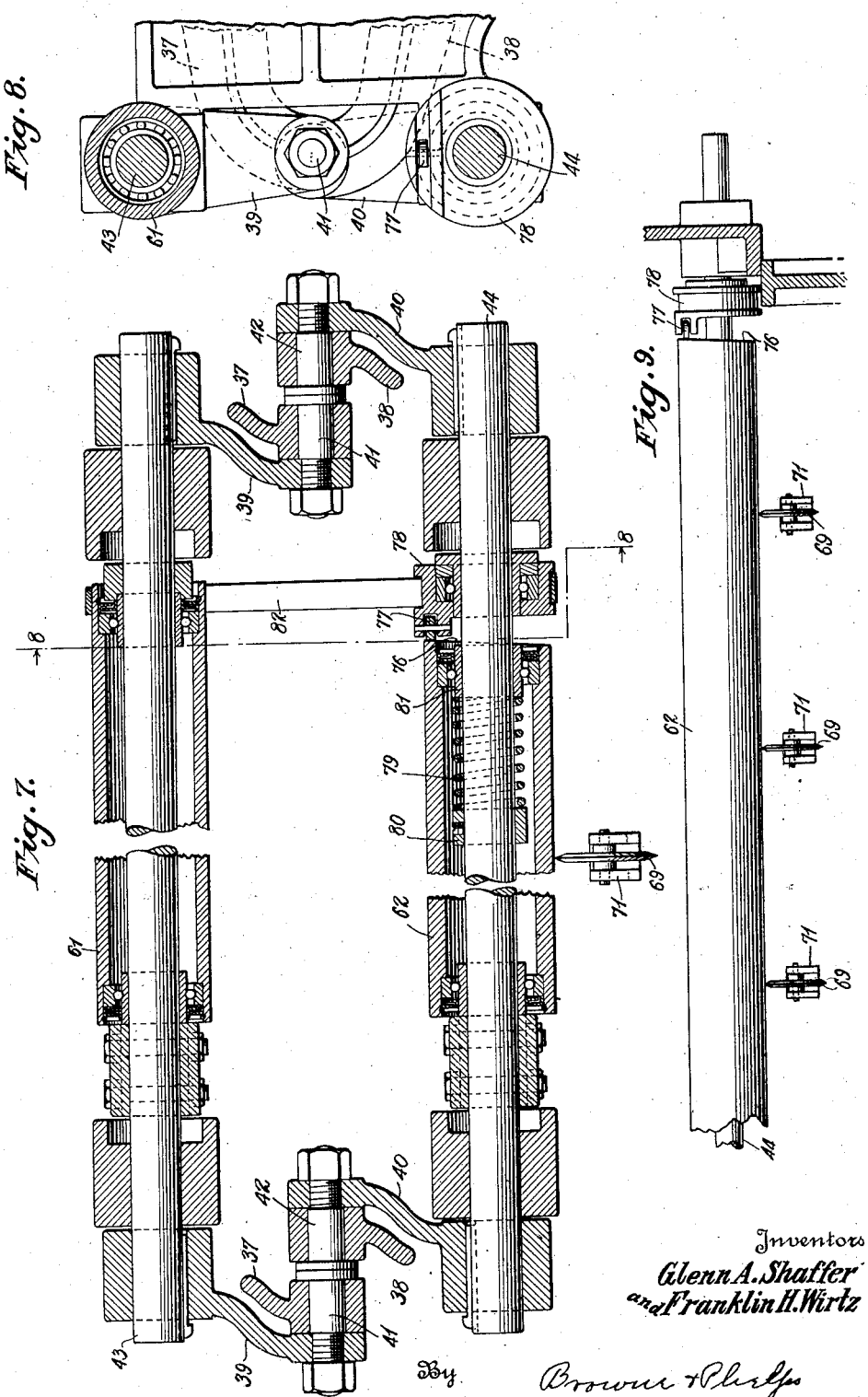

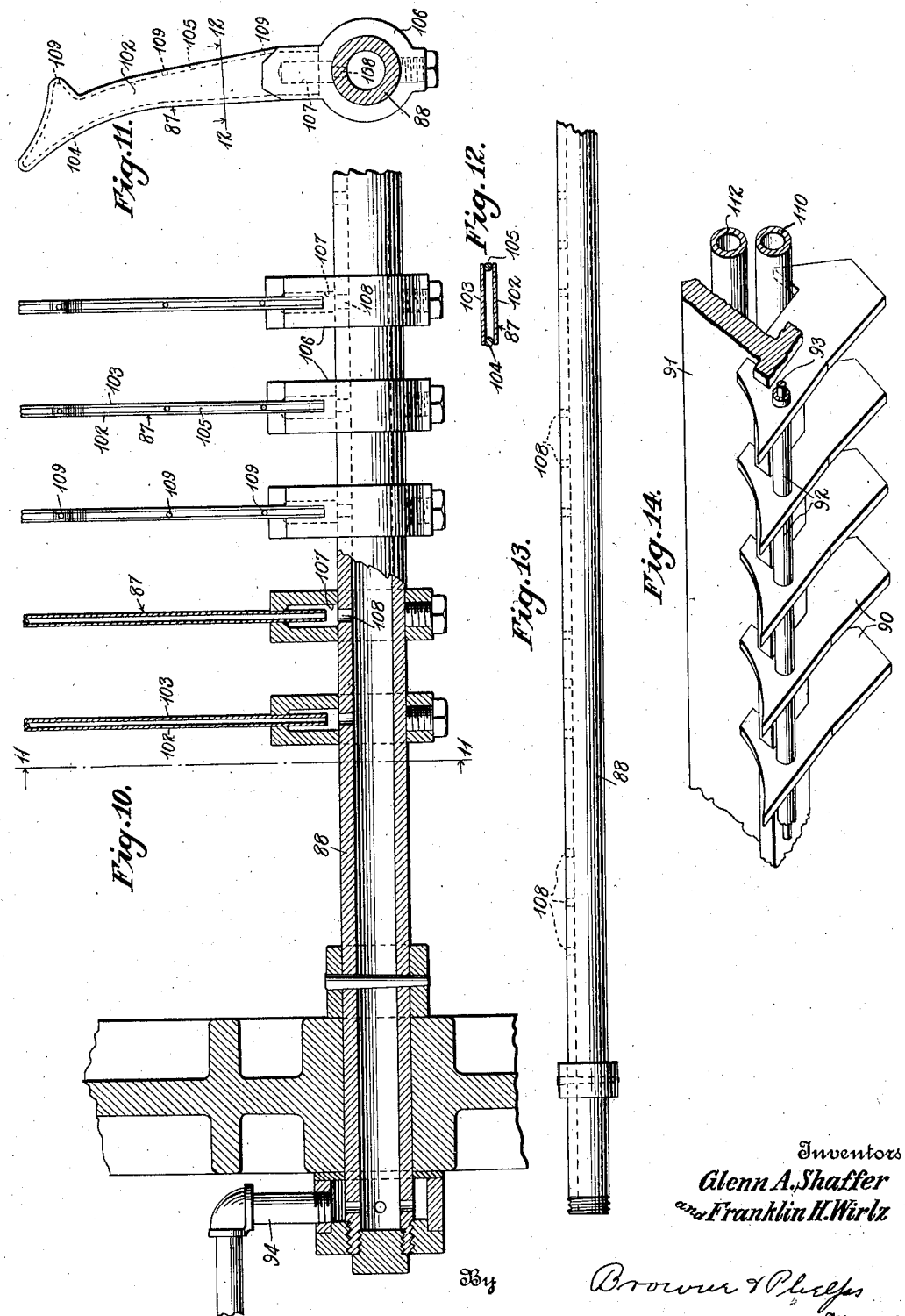

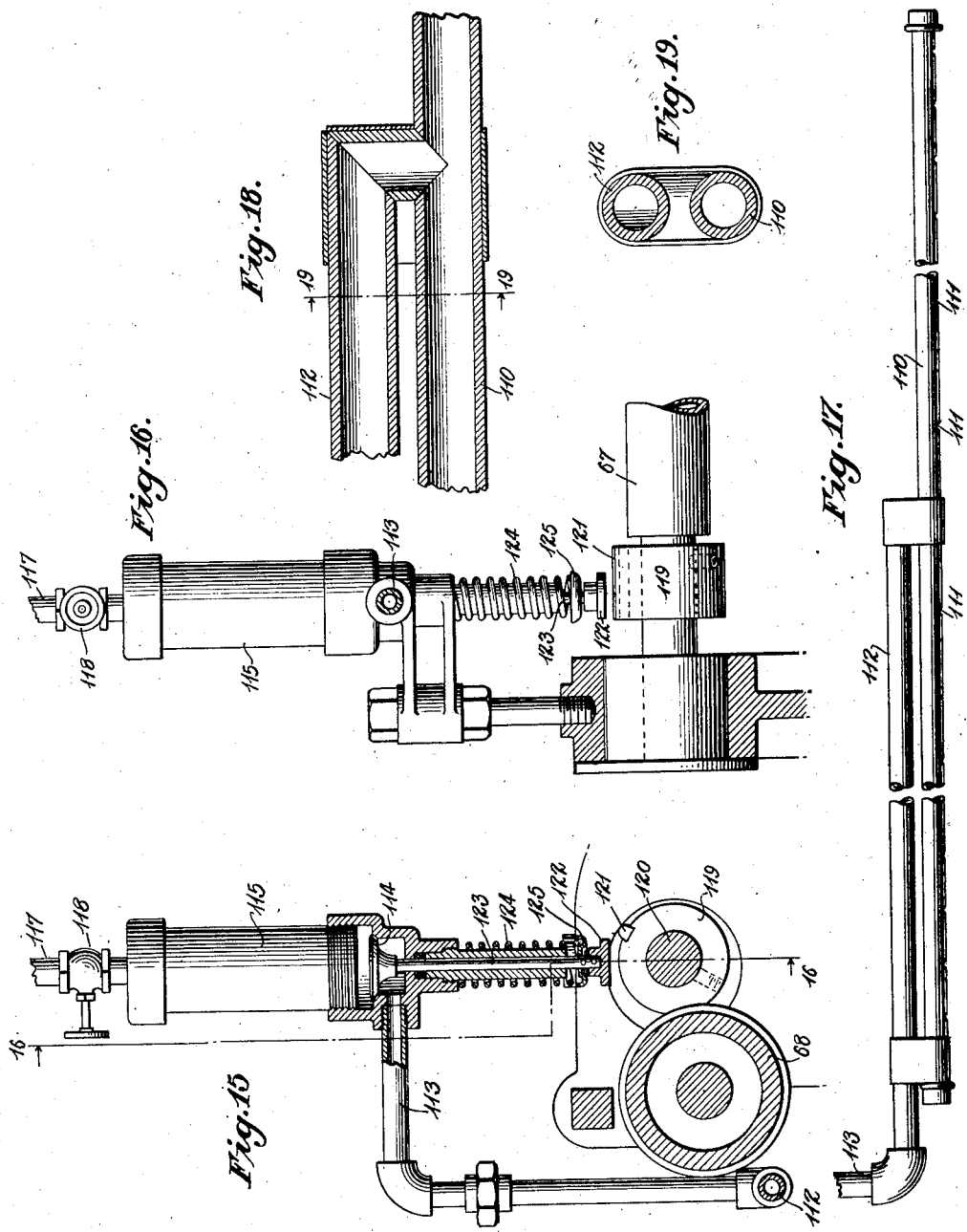

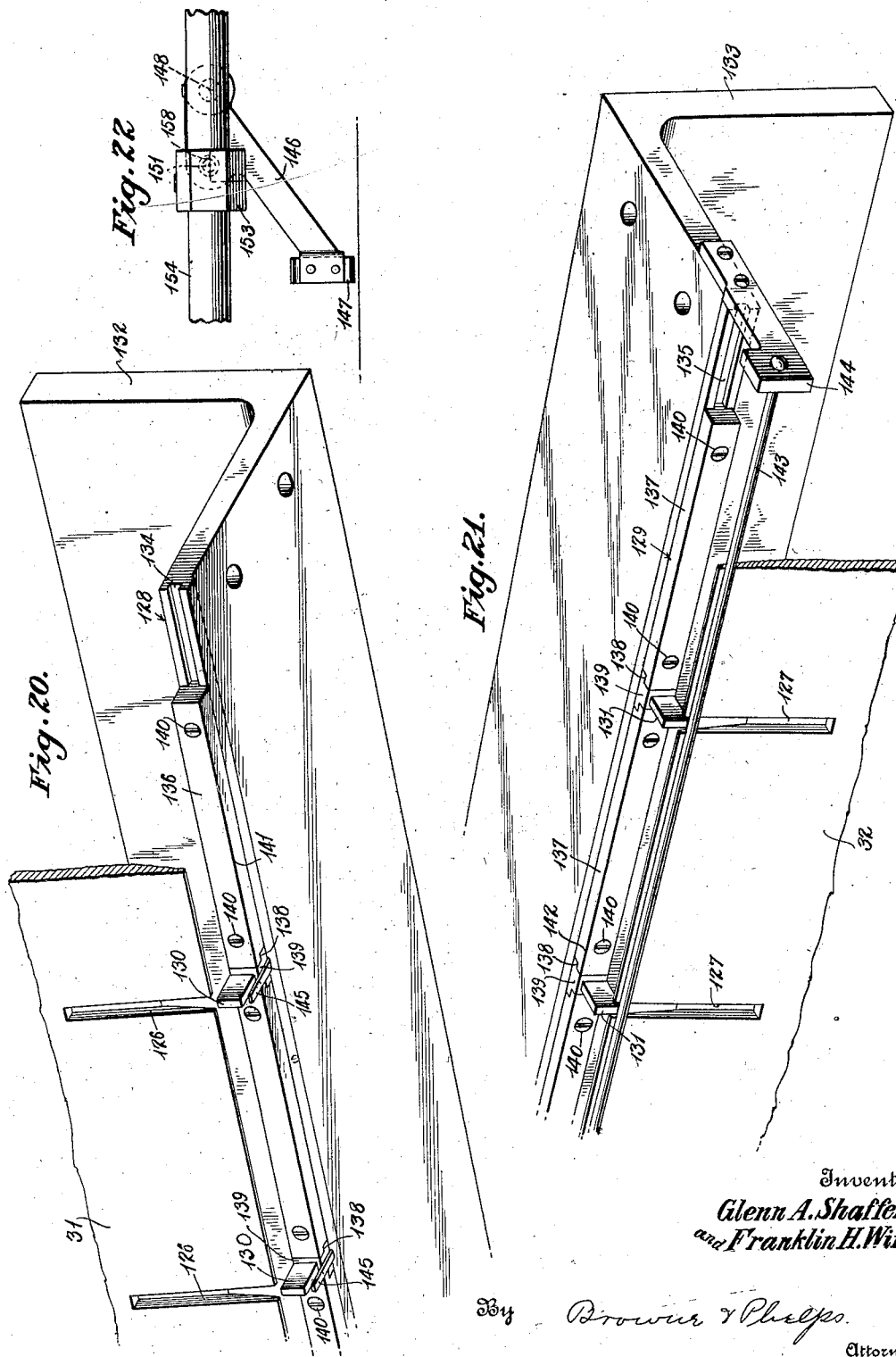

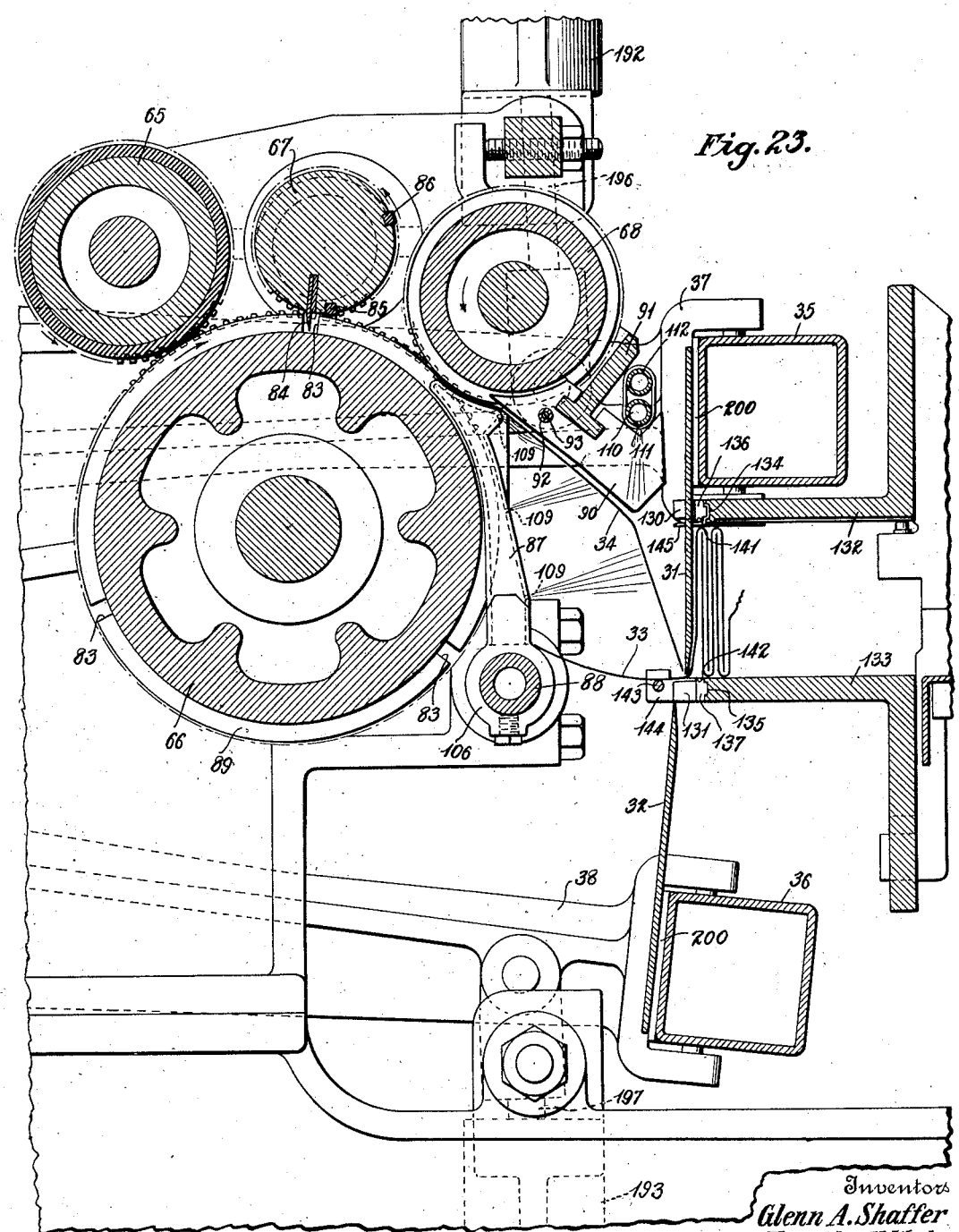

Patented Apr. 2, 1929.

1,707,580

UNITED STATES PATENT OFFICE.

GLENN A. SHAFFER AND FRANKLIN H. WIRTZ, OF GREEN BAY, WISCONSIN.

MACHINE FOR INTERFOLDING SHEETS.

Application filed November 7, 1927. Serial No. 231,548.

The invention relates to paper slitting, interfolding, and package labeling machines and has as an object the provision of details of improvement over the machine shown in our former Patent No. 1,572,817 dated February 9, 1926, machine for interfolding paper.

It is an object of the invention to improve the details of a known form of slitting device and to apply the same to a machine such as shown in our former patent.

It is a further object of the invention to improve the action of the interfolding blades of the said patent.

It is a further object of the invention to improve the means for advancing the paper through the machine.

It is a further object of the invention to provide air blast means for controlling the free edges of the sheets as they are interfolded.

It is a further object of the invention to provide resilient means for holding the rollers covering the interfolding blades against their actuating cams.

It is a further object of the invention to provide means for marking the sheets which will indicate the number of sheets to be removed and made into each package.

It is a further object of the invention to provide means for placing labels about packages of sheets interfolded by the machine, the size of which packages are indicated by the marking means.

It is a further object of the invention to provide means to prevent the sheets from being displaced as they are fed into the receiving chute.

Further objects of the invention will appear from the following description when read in connection with the accompanying drawings showing an illustrative embodiment of the invention and wherein:—

Fig. 4 is a detail vertical section on line 4—4 of Fig. 1;

Fig. 5 is a detail vertical section on line 5—5 of Fig. 2;

Fig. 6 is a detail vertical section on line 6—6 of Fig. 1;

Fig. 7 is a detail vertical section on line 7—7 of Fig. 1 on an enlarged scale;

Fig. 8 is a detail vertical section on line 8—8 of Fig. 7;

Fig. 9 is a detail vertical section on line 9—9 of Fig. 1;

Fig. 10 is a side view of the blast pipe and stripper arms partly in section on line 10—10 of Fig. 4 on an enlarged scale;

Fig. 11 is a vertical section on line 11—11 of Fig. 10;

Fig. 12 is a horizontal section on line 12—12 of Fig. 11;

Fig. 13 is a detail side elevation of the blast pipe of Fig. 10 showing a modified spacing of the blast openings;

Fig. 14 is a perspective view of the upper stripper blades showing the location of the puff-producing pipes;

Fig. 15 is a detail elevation partly in section of means for producing puffs of air from the lower pipe shown in Fig. 14;

Fig. 16 is a detail side view of the elements shown in Fig. 15;

Fig. 17 is a side view of the puff pipe, emission of air from which is controlled by the mechanism of Figs. 15 and 16;

Fig. 18 is a detail vertical section through the connection between the pipes of Fig. 17 upon an enlarged scale taken parallel with the plane of Fig. 17;

Fig. 19 is a vertical section on line 19—19 of Fig. 18;

Figure 1:
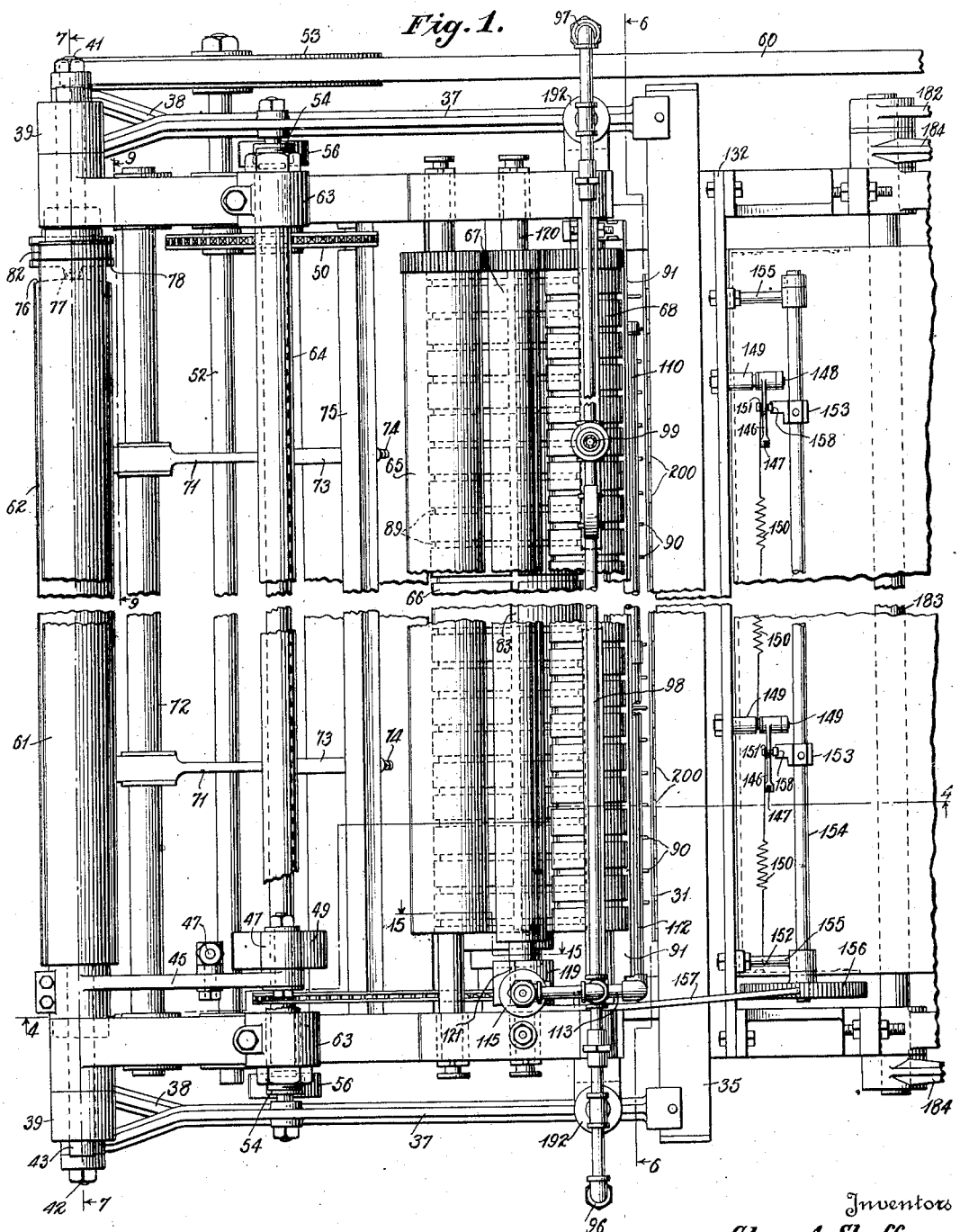
Figure 1 is a detail plan view broken away to reduce its longitudinal extent.

Figs. 20 and 21 respectively are detail perspective views of the upper and lower entry edges of the chute showing portions of the interfolding blades;

Fig. 22 is a detail side view of the marking device;

Fig. 23 is a detail vertical section through the cutting and interfolding mechanism shown in Fig. 4 upon an enlarged scale;

Figs. 24 to 31 inclusive are views diagrammatic in character showing the successive steps in the action of the interfolding blades;

Fig. 32 is a detail horizontal section on line 32—32 of Fig. 4;

Fig. 33 is a detail transverse section showing the cam 56 and rolls 54, 55 segregated from the remaining mechanism.

Figure 24:
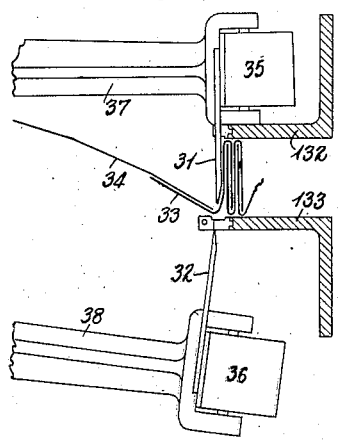
Figure 25:
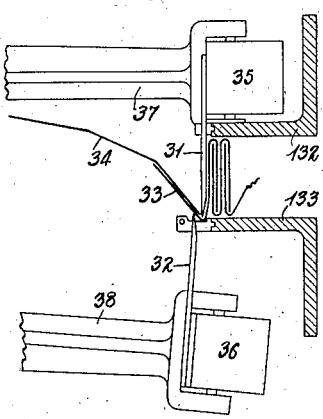
Figure 26:
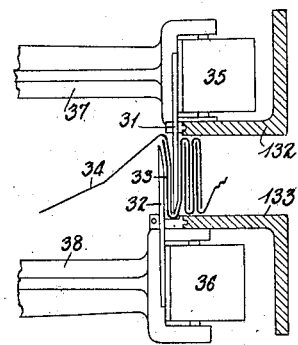

The function of the interfolding mechanism is illustrated in Figures 24 to 29 inclusive wherein the interfolding blades 31, 32 are shown, the blade 31 being in a position about to complete its last movement in the folding of the sheet 33, the sheet 34 having just arrived with its leading edge overlapping the trailing edge of sheet 33 and the blade 32 being in position to start its upward movement. The action of the blades is as follows, from the position of Figure 24:

In Figure 24, sheet 34 has just arrived in position as shown and blade 32 has started its upward movement which will fold the end of sheet 33 over sheet 34 as shown in Figure 25. Blade 31 now makes a slight supplemental movement down to tuck folded edge of sheet 33 against fingers 131 to crease same between shoulder 142 and blade 32. Blade 31 immediately withdraws as shown in Figure 26. Blade 31 is now moved to the left and blade 32 is moved to the right as in Figure 27 creasing last lower fold. Then blade 31 comes down as in Figure 28. Blade 32 now makes a slight upward tuck and is then withdrawn as in Figure 29. Blade 31 then moves to the right and blade 32 moves to the left creasing the upper last fold against shoulder 141 leaving the machine in exactly the same position as shown in Figure 24.

To produce this action of the tucking blades, the blades carried by the beams 35, 36 are mounted upon arms 37, 38 shown in plan in Figure 1, which arms are pivoted at their forward ends upon arms 39, 40, Figure 4, shown in section in Figure 7, by means of stub shafts 41, 42, the arms 39, and 40 each being one arm of a bell crank, the bell cranks being rigidly carried by shafts 43, 44, the remaining arms of which bell cranks, shown at 45, 46, Figure 4, carry upon their ends rollers 47, 48 coacting with a cam 49 driven by sprocket chain 50 passing about sprocket 51 mounted upon shaft 52 and driven by pulley 53 by means of which bell crank, cam and driving means the front and rear movement of the tucker blades is caused. The arms 37, 38 are provided with rollers 54, 55 coacting with a cam 56, shown in dotted lines in Figure 4. To hold the rollers 47, 48 against the cam 49, there is shown a link 57 pivotally secured to arm 46 and acting through a spring 58 upon the arm 45.

The pulley 53 may be driven by a motor mounted upon the frame of the machine as indicated at 59, Figure 5, by means of a belt 60.

The material to be acted upon by the machine is fed to the machine from the parent roll first over a roller 61 loosely mounted upon shaft 43 then about rollers 62 loosely mounted upon shaft 44 then over roller 63 mounted upon shaft 64 journalled in the frame of the machine thence between rollers 65, 66 and rollers 67, 66, and rollers 68, 66 to the interfolding mechanism.

To slit the paper into lengths corresponding to the lengths of towels or the like, there are shown slitting knives 69 each mounted upon a shaft 70 carried by the ends of members 71, Figure 4, pivoted upon a shaft 72 and spring pressed against roller 62 by means of leaf springs 73 also shown in Figure 4. The pressure of the slitters against roller 62 may be adjusted by means of a screw 74 carried by the end of the spring bearing against lugs 75 mounted upon the frame of the machine.

The action of the hardened slitting knives 69 upon the roller 62 continuously at one point would quickly wear the roller. To avoid this defect, one end of roller 62 is shown as bevelled at 76, Figure 7, and spring pressed against a roller 77 mounted in a pulley 78 freely rotatable upon shaft 44. The roller 62 is movable longitudinally on the shaft 44 and is held into contact with the roller 77 by means of a spring 79 abutting against a collar 80 fixed upon the shaft and also abutting against the bearing 81 of the roller upon the shaft. The pulley 78 is slightly larger than the rollers 61, 62 and is driven by means of a belt 82 passed about roller 61.

The rollers 61, 62 are driven at the same speed and the slight difference in size between pulley 78 and the rollers will cause the pulley 78 to have a slower revolution relative to the roller 62 which will cause a precession of roller 77 with respect to the beveled end of roller 62 causing the said end to act as a cam to produce a slow longitudinal oscillatory motion of the roller 62 upon the shaft 44 whereby to cause the slitters 69 to work upon a band of the surface of the roller rather than upon a line about its circumference whereby to distribute the wear.

The rollers 65 and 68 are desirably covered with rubber to provide a gripping action between these rollers and roller 66. The roller 68 is given a slightly excessive peripheral speed over that of roller 65 so as to cause the paper to be stretched about the rollers 66. The roller 66 is shown as formed with longitudinal slots 83 distributed about the roller a circumferential distance according to the width into which the paper is to be severed, which circumferential distance equals the entire circumference of roller 67 and the roller 67 is provided with a knife 84 adapted to enter the slots whereby to sever the paper.

To provide an extra hold upon the paper at the instant of its severance, the roller 67 is provided with a longitudinal insert 85 of rubber or the like projecting slightly from its periphery which will act against roller 66 to tighten the paper at the instant of its severance.

When the slots 83 reach the point of contact between roller 66 and roller 65, the grip between these rollers will be momentarily absent and the pull of roller 68 will give an uneven movement to the paper. To provide for an even action, a second insert 86 of rubber or the like is provided on roller 67 which will come into contact with roller 66 at the instant of the passage of a slot 83 through the point of contact of rollers 65, 66. To cause the paper to leave the surface of roller 66, there are provided stripper plates 87 carried by a pipe 88 and resting in circumferential grooves 89 in roller 66 and to insure that the paper does not adhere to the surface of roller 68, stripper plates 90, shown in perspective in Figure 14, are shown as mounted upon a bar 91 carried by the frame of the machine, the plates 90 being held in properly spaced relation by means of sleeves 92 mounted upon a rod 93 passing through perforations in the plates 90.

To support the free edges of the paper during its interfolding, the invention provides a blast of air which in the embodiment shown is delivered by the stripper plates 87, being led thereinto through pipe 88 by means of supply pipes 94, 95 from pipes 96, 97 in communication with pipe 98 from a general supply connection 99, Figure 6. The amount of blast may be controlled by means of valves 100, 101.

To deliver the blast, the stripper plates 87 are given the construction shown in Figures 10, 11, and 12, wherein these plates are shown as formed of plates 102, 103 held spaced apart by means of members, as wires, 104, 105 placed between the edges of the plates and soldered or brazed thereto. To connect the stripper plates to the pipe, they are shown as each inserted in a slot formed in a hub 106 surrounding the pipe and having a cavity 107 in communication with openings 108 in the pipe 88. Outlets for the blast from the stripper plates 87 are shown in the form of openings 109. The free edges of the paper are supported by the blast described in the manner shown in Figure 23.

To insure that the leading edge of the incoming sheet passes over the trailing edge of the preceding sheet, it is desirable to have the trailing edge depressed at the moment of entry of said leading edge. To this end there is provided a downward puff of air at the proper moment, which puff is supplied through a pipe 110 located in angles of the stripper plates 90, the pipe 110 being perforated as shown at 111, Figure 17.

To conduct air to the pipe 110, there is shown a pipe 112 opening thereinto as shown in Figure 18 adjacent the central portion of the length of pipe 110, the pipe 112 being in communication through pipe 113 with the space below a poppet valve 114, Figure 15, controlling the escape of compressed air from a cylinder 115 in communication with pipe 97 by means of a T 116 and pipe 117, a valve 118 being provided to control the puff.

To actuate the valve 114, there is shown a collar 119 mounted upon the shaft 120 of roller 67 and carrying a cam 121 acting against a tappet mounted upon the end of valve stem 123 which is pressed downwardly by means of spring 124 abutting against a cup 125 carried by the valve stem whereby to provide a puff from the opening 111 at the desired instant.

The puff apparatus may be omitted in the interfolding of heavy paper such as towels. The slitting apparatus may be omitted in the interfolding of toilet paper and the entire length of the interfolded sheets may be labeled and separated after labelling into bundles. When the slitting apparatus is used, it may be desirable to provide more of the blast from stripper plates 87 to the edges of the thus separated sheets than in the center thereof, in which event the even spaces of the stripper plates may be varied to group them as indicated in Figure 13 wherein the holes 108 are shown near together at the positions occupied by the edges of the sheets divided by the slitters, in which case the circumferential grooves 89 in roller 66 will be placed accordingly.

In the machine of our former patent a difficulty was found to be that the tucker blades in their outward movement were likely to drag the paper out of the chute. According to the present invention, the blades 31, 32 are formed with slots 126, 127, respectively, and the edges 128, 129 of the chute are provided with fingers 130, 131, respectively, projecting into the slot. These fingers are desirably formed in the manner shown in Figures 20, 21. The edges of the angles 132, 133 forming the opening of the chute are shown as grooved at 134, 135 to which grooved edges are secured blocks 136, 137 having their ends rabbeted as at 138 to overlie blocks 139 carrying the fingers 130, 131, which fingers are retained in place by means of screws 140 holding the blocks 136, 137 upon the angles.

The fingers 130, 131 are shown as slightly less in width than the blocks 136, 137, to provide continuous shoulders at 141, 142 along the edges of the chutes for a purpose to be described.

To support the paper between the fingers 131 upon the lower angle 133, there is shown a rod 143 mounted in projecting arms 144 carried by the end of angle 133 behind which rod the tucker blade 32 moves.

The support on the folded sheets in the chute by gravity upon the upper surface of the angle 133 results in an evenness of the lower edge in the folded package but the upper edge of the package is liable to be uneven due to the dragging upward of sheets by plate 31. To avoid this defect, a spring 145 is provided opposite each of the fingers 130, which spring may be compressed by the supplemental tuck given to the sheets at the instant of the beginning of the upward movement of blade 32, and which spring will serve to even the upper edges of the folded sheets.

To mark the upper edges of certain of the sheets to indicate where the successive sheets fed to the chute are to be separated to make packages of the desired size, there are shown arms 146 carrying felt 147 upon their ends, which felt may be saturated with ink, and which arms are pivoted as at 148 upon stub shafts 149 secured to the vertical member of angle 132, the arms being held in the normal position shown in Figure 22 by means of springs 150, said springs anchored at one end in an eye 151 formed in arms 146 and the remaining ends of said springs anchored to the adjacent stub shaft 149 or to the frame of the device as at 152.

To actuate the arms 146, there are shown members 153 carried by shaft 154 journalled in arms 155 also carried by angle 132 and provided at one end with a ratchet wheel 156. The ratchet wheel 156 is operated one tooth at each revolution of roller 67 through the medium of a pawl 157 slidably mounted upon the frame of the device and actuated by a cam carried by the end of the roller 67, being given an impulse at each revolution of the roller 67. The number of teeth in the ratchet wheel 156 corresponds to the number of sheets to be placed in each package and when the members 153 have made a full revolution they will strike upwardly upon a projection 158 carried by the arms 146 and shown in Figure 4. When the projections 158 slip off from the members 153, they will by their momentum fly past the center of the pull of springs 150 and impinge upon the upper edge of one of the sheets in the chute thereby making a mark upon such edge which will guide the operator in removing the proper size bundles from the chute for labeling. The number of marking arms 146 will correspond with the number of slitters used upon the machine.

Figure 2:
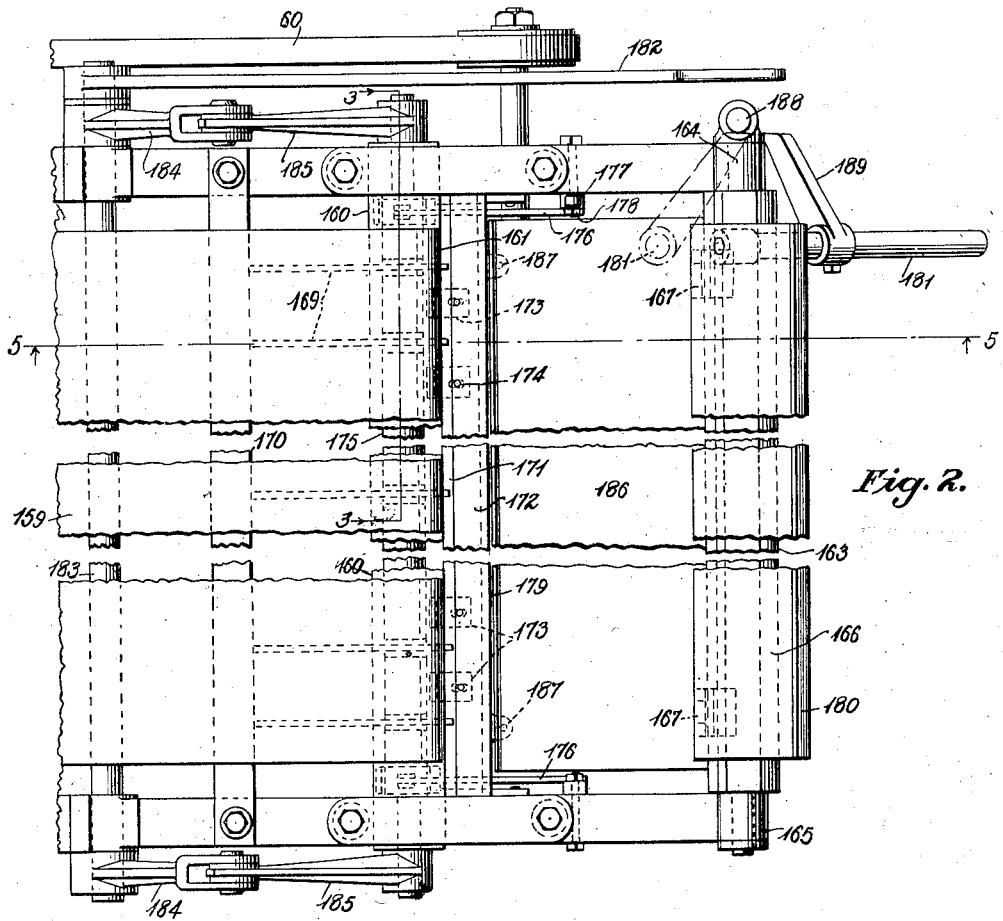
Fig. 2 is a plan view comprising an extension to the right of Fig. 1 further reduced in length.
Figure 3:
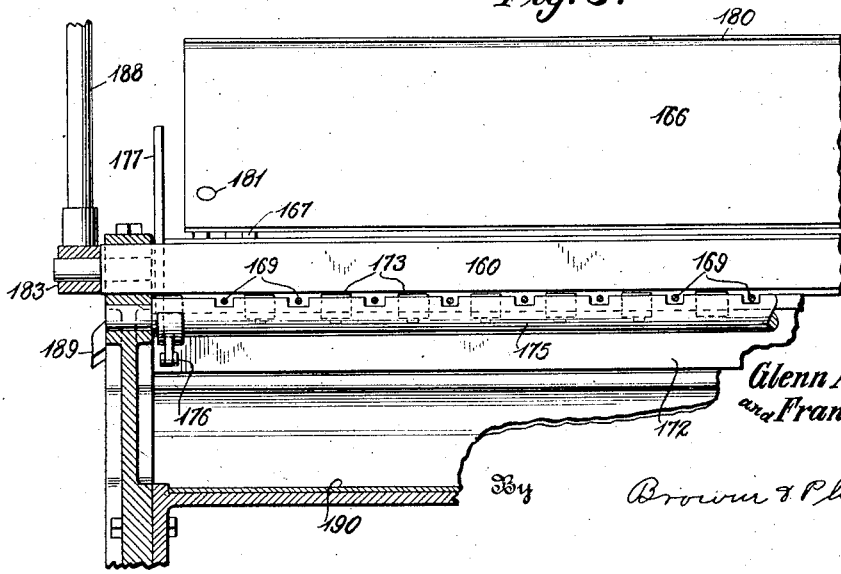
Fig. 3 is a detail section on line 3—3 of Fig. 2 on an enlarged scale.

To place labels about the packages, the mechanism shown in Figures 2, 3, and 5 is provided. As there shown the chute terminates in a thin sheet metal apron 159 along which the sheets separated to form a package may be slid over the sliding block 160, the apron 159 being supported by a rod 161 carried by the frame of the device.

To hold the packages while being labeled, there is shown a clamp comprising a jaw 162 rigidly carried by a block 163 pivoted at its ends in journals 164, 165, and hinged to the block 163 is a movable jaw 166 by means of hinge 167.

To hold the label indicated at 168 while the bundle is placed therein, there are shown spring fingers 169 clamped at 170 at one end and normally lying in a rabbet 171 in angle 172.

To properly locate the edge of the label, there are shown stop members 173 projecting upwardly between fingers 169 and secured to angles 172 by means of screws 174, the opening through the horizontal member of stops 173 being slotted to permit of longitudinal adjustment of the stops.

To raise the fingers 169 to permit the introduction of the edge of a label therebeneath, there is shown a cam member 175 operated by link 176 through the medium of a lever 177 at 178 to rotate the cam 175 acting to raise the fingers whereupon the edge of the label may be slipped under fingers 169 which will clamp the label when the lever 177 is returned to normal position. To retain the bundle between the clamp members 162 and 166 after its compression, these members are shown as provided with flanges 179, 180 on their edges.

In the operation of the labeling device the label is placed as indicated for each of the bundles to be wrapped when the bundles are slid along the apron 159 to position upon the labels. The handle 181 is operated to lock the upper member 166 of the clamp carrying the upper side of the label with it, when the lever 182 is depressed acting through shaft 183 to straighten the toggle 184, 185 causing the block 160 to compress the package against the block 163 of the clamp.

A spring plate 186 is provided within the lower clamp member 166, which spring plate is held normally flush with flange 179 by means of a set screw 187. The lever 188 mounted upon block 163 is then slightly rotated to lift flange 179 against the lower face of block 160 with consequent depression of spring plate 186, the thickness of block 160 being equal to the space between flanges 179, 180 when the clamp is closed. The flanges 179, 180 will now grip the upper and lower edges of the outer sheet in the bundle and the folds of the label and the block 160 is returned to its normal position by return to normal of lever 182. The levers 181 and 188 are then locked in their relative position when the clamp is closed by means of a cam 189 rotatably mounted upon handle 181 and impinging against handle 188 after which the handles 181 and 188 are rotated together, the block 163 rotating in journals 164, 165 to bring the clamping device carrying the package therein to a vertical position, in which position the projecting ends of the label may be pasted, the package with the pasted label being returned to horizontal position and the paste being set by pressure upon lever 182 to cause the block 160 to press against the pasted joint. After a sufficient interval to permit adherence of the paste, the clamp may be opened and the labeled bundles removed.

A supply of labels may be carried upon plate 190 with their edges lying against flange 191 so as to be readily accessible to the operator.

To hold the rollers 54, 55 against cam 56, there are shown compressed air cylinders 192, 193 supplied with air under pressure from pipe 98 by means of pipes 194, 195. A piston in each cylinder has its plunger rod 196 or 197 connected to one of the arms 37, 38 to provide a continuous pressure upon the arms thus providing an air spring upon each arm for the purpose described.

Figure 27:
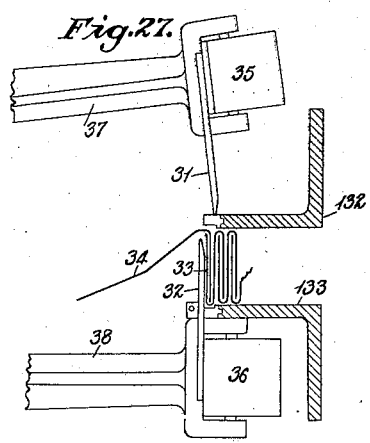
Figure 28:
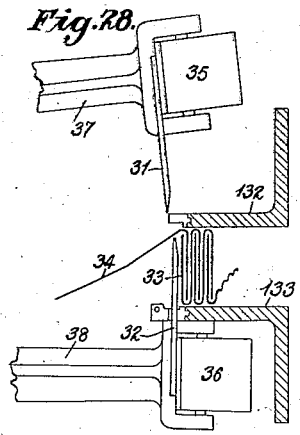
Figure 29:
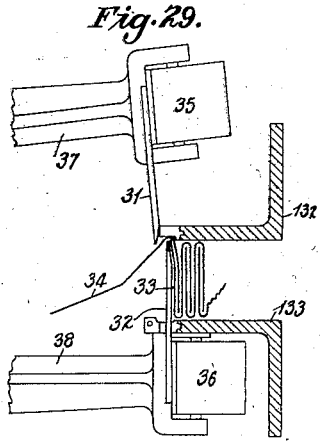
Figure 30:
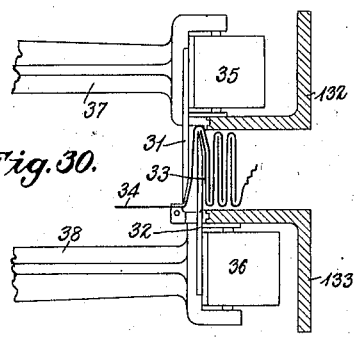
Figure 31:
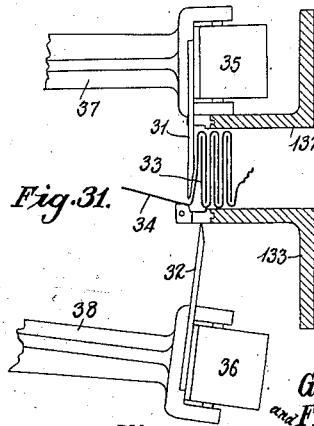

One of the features of improvement provided by the invention is the supplemental tuck provided by the tucker blades 31, 32 to bring the last fold of each sheet against the shoulder 141 or 142. In the position of Figures 26, 27, the vertical position of the tucker blades dwells by virtue of the concentric portion of the cam 56 just prior to the retraction of the tucker blades caused by cam 56. The blades are given the supplemental tuck referred to by virtue of a depression 198 in the cam indicated in Figure 4 causing the said last fold to be pinched between the tucker blade and the shoulders 141 or 142.

The tucker blades 31, 32 must be accurately straight throughout their length and it is difficult to machine the beam 35, 36 in this manner. To attain this end the beams 35, 36 are formed with separated ribs 200, shown in section in Figure 30, the surface of which ribs may be brought to true alignment and serve to support the tucker blades 31, 32 in accurate planes.

The operation of the device will be clear from the above description.

We claim:

1. A paper folding machine comprising in combination, slitting means, a roll about which said means presses in the act of slitting paper and means to cause relative movement between said first named means and the roll longitudinally of the roll, means to advance the thus separated strips of paper, means to sever the strips into sheets and common means to simultaneously interfold the plurality of sheets thus produced with preceding and following sheets from corresponding strips.

2. A paper folding machine comprising in combination, a paper slitting disc, a roll about which paper is carried while being slitted, means for pressing said disc against said roll and means providing relative movement between said disc and roll longitudinally of the roll, means to advance the thus separated strips of paper, means to sever the strips into sheets and common means to simultaneously interfold the plurality of sheets thus produced with preceding and following sheets from corresponding strips.

3. A paper folding machine comprising in combination, a slitting disc, a roll against which the edge of said disc is pressed in the act of slitting paper carried about said roll and means providing longitudinal movement of the roll during the act of slitting, means to advance the thus separated strips of paper, means to sever the strips into sheets and common means to simultaneously interfold the plurality of sheets thus produced with preceding and following sheets from corresponding strips.

4. A paper interfolding machine comprising in combination, a pair of tucker blades, means for moving said tucker blades transversely and means for moving said tucker blades vertically comprising a cam, a pair of bell cranks operatively associated with said cam at opposite sides thereof, and means to press said bell cranks toward said cam comprising a link anchored to one of said cranks and having resilient means connected to the remaining crank whereby to urge said bell cranks toward said cam.

5. A paper interfolding machine comprising in combination, a pair of tucker blades, means to move said tucker blades transversely and means to move said tucker blades vertically, said last named means formed to provide a slight additional vertical movement in one direction immediately prior to its main vertical movement in the opposite direction.

6. A paper interfolding machine comprising in combination, a roll about which paper to be severed and folded is carried, and having knife receiving slots in its periphery, a pair of rolls located to press papers against said first named roll, means to drive one of said last named rolls at a peripheral speed slightly in excess of the other thereof whereby to stretch paper over said knife slots, a knife carrying roll located between said second named rolls, and carrying a knife coacting with said slots to sever paper, interfolding mechanism to interfold the thus severed sheets, said rolls acting to forward paper to the severing means and to subsequently feed the severed sheets to said interfolding mechanism.

7. A paper interfolding machine comprising in combination, a roll about which paper to be severed and folded is carried and having longitudinal slots in its periphery, rolls coacting with said first named roll to grip paper and cause travel thereof, means to drive one of said last named rolls at a peripheral speed slightly in excess of the other thereof, a roll carrying a knife adapted to enter said slots located between said second named rolls and means carried by the surface of said last named roll to grip paper when the grip between one of said first named rolls and said slotted roll is broken by passage of a slot past the point of contact between the same and the first named roll, interfolding mechanism to interfold the thus severed sheets, said rolls acting to forward paper to the severing means and to subsequently feed the severed sheets to said interfolding mechanism.

8. A paper interfolding machine comprising in combination, a roll about which paper to be severed and interfolded is carried and having longitudinal knife receiving slots in its periphery, a pair of rolls coacting with said first named roll to advance paper, means for driving one of said last named rolls at a peripheral speed slightly in excess of the other thereof to stretch paper upon the periphery of the first named roll, a knife roll carrying a knife coacting with said slots to sever paper and means carried by said knife roll for additionally stretching paper at the moment of severance.

9. A paper interfolding machine comprising in combination, means for severing paper, means for interfolding the severed paper and means for producing a blast of air to support the severed sheets during the interfolding thereof.

10. A paper interfolding machine comprising in combination, means for severing paper, means for interfolding the severed sheets and means for producing a puff of air to depress the trailing edge of each sheet to permit the leading edge of the succeeding sheet to pass above the same.

11. A paper interfolding machine comprising in combination, a pair of vertically moving tucker blades having transverse slots, a chute to which interfolded paper is fed by said tucker blades, and fingers projecting from the edges of said chute and extending through said slots to prevent paper being dragged from said chute by movement of the tucker blades.

12. A paper interfolding machine comprising in combination, a pair of vertically moving tucker blades having transverse slots, a chute to which interfolded paper is fed by said tucker blades, fingers projecting from the edges of said chute and extending through said slots to prevent paper being dragged from said chute by movement of the tucker blades, and means carried by one of the edges of said chute for supporting paper between said fingers.

13. A paper interfolding machine comprising in combination, vertically moving tucker blades, a chute to which interfolded paper is fed by said tucker blades and spring means acting upon the upper edges of the folds to hold the same in a common plane.

14. A paper interfolding machine comprising in combination, a pair of vertically moving, transversely slotted tucker blades, a chute to which interfolded paper is fed by said blades, fingers projecting from the edges of said chute through the slots in said blades, said fingers being of less width than the thickness of the edges of the chute to provide a shoulder along each edge, means for causing said tucker blades to press folds of paper against said shoulders momentarily at the initiation of the folding action of the remaining blade.

15. A paper folding machine comprising, in combination, a pair of idle rollers about which paper is led to the machine, one of said rollers comprising a shaft, a cylinder revolubly and slidably mounted on said shaft and bearing a cam, means mounted on said shaft coacting with said cam to induce reciprocable sliding movement of said cylinder, a slitting member coacting with said cylinder to sever paper passing thereabout longitudinally of the strip, means to sever the thus produced strips into sheets, and means to interfold the sheets.

16. A paper folding machine comprising, in combination, a pair of idle rollers about which paper is led to the machine thereby inducing revolution of the rollers, one of said rollers comprising a shaft, a cylinder revolubly and slidably mounted on said shaft and having a cam-shaped end, a driven member revolubly mounted on said shaft in longitudinally fixed position adjacent the cam end of said cylinder and having a portion coacting with said cam, means for driving said member from the remaining idle roller at a speed differing from that of said cylinder whereby to induce longitudinal reciprocation of said cylinder, a slitting member pressed against said cylinder to sever paper passing thereabout longitudinally of the strip, means to sever the thus produced strips into sheets and means to interfold the resulting sheets.

17. A paper folding machine comprising, in combination, a pair of idle rollers of like diameter about which paper is led to the machine thereby inducing revolution of said rollers, one of said rollers comprising a fixed shaft, a cylinder revolubly and slidably mounted on said shaft and having a cam end in a plane out of perpendicular to the axis of the shaft, resilient means housed in the cylinder urging said cylinder in the direction of the cam end thereof, a pulley differing in diameter from said rollers revolubly mounted on said shaft in longitudinally fixed position adjacent said cam end and carrying a roller against which said cam end is pressed by said resilient means, a belt passing about said pulley and the remaining roller to drive said pulley at a speed differing from that of said rollers, a severing blade pressed against said cylinder to sever paper into strips, means to sever the strips into sheets and means to interfold the resultant sheets.

18. A paper interfolding machine comprising, in combination, means for severing paper, a pair of reciprocating tucker blades acting to interfold the severed sheets and means for producing a blast of air under the trailing portions of said sheets to support the same during the folding thereof.

19. A paper interfolding machine comprising, in combination, a pair of reciprocating tucker blades moving into alternately overlapped position, means for severing paper into sheets and delivering the sheets to said blades to be folded thereby, means for driving said blades and first named means in timed relation whereby to produce an odd number of alternate folds and to introduce the leading edge of each sheet into the last fold of the preceding sheet, and means for producing a blast of air under the trailing portions of the sheets to support the same during folding.

20. A paper interfolding machine comprising, in combination, a pair of reciprocating tucker blades moving into alternately overlapped position, means for severing paper into sheets and delivering the sheets to said blades to be folded thereby, means for driving said blades and first named means in timed relation whereby to produce an odd number of alternate folds and to introduce the leading edge of each sheet into the last fold of the preceding sheet, means to produce a puff of air to depress the trailing edge of each sheet immediately before delivery of the leading edge of the succeeding sheet to insure inclusion thereof in the said last fold.

21. A paper interfolding machine comprising, in combination, means for severing paper, means for interfolding the resulting sheets, means for producing a blast of air to support the sheets during folding thereof and means for producing a puff of air opposed to said blast acting to depress the trailing edge of each sheet to permit the leading edge of the succeeding sheet to pass above the same.

22. A paper interfolding machine comprising, in combination, a pair of rolls coacting to feed sheets of paper to interfolding blades, one of said rolls having circumferential grooves in its periphery, a series of stripper plates each projecting into one of said grooves, certain of said plates having air passages therein communicating with blast openings in the surface of said plates exterior of said grooves and means for conducting air under pressure to said passages whereby to provide a blast to support the sheets during the folding thereof.

23. A paper interfolding machine comprising, in combination, a roll having circumferential grooves and a longitudinal groove in its periphery, a roll carrying a longitudinal knife coacting with said longitudinal groove to sever paper into sheets, a third roll coacting with said grooved roll to feed the sheets to interfolding mechanism, a conduit mounted adjacent said grooved roll, stripper plates mounted on said conduit and having air passages therein in communication with the interior of said conduit, said plates formed with pointed ends lying in said circumferential grooves below the surface of the roll and standing above said surface adjacent said points, said plates having outlets from said passages in their edges opposite said grooves and means to supply air under pressure to said conduit.

GLENN A. SHAFFER.
FRANKLIN H. WIRTZ.